United States Patent [19]
Matsui et al.

[11] Patent Number: 5,101,093
[45] Date of Patent: Mar. 31, 1992

[54] CONTACT TIP FOR ARC WELDING

[75] Inventors: Hitoshi Matsui; Taiji Hattori, both Toyota, Japan

[73] Assignee: Toyota Jidosha Kabushiki Kaisha, Toyota, Japan

[21] Appl. No.: 630,812

[22] Filed: Dec. 20, 1990

[30] Foreign Application Priority Data

Dec. 21, 1989 [JP] Japan .................. 1-146495

[51] Int. Cl.⁵ .................. B23K 9/26
[52] U.S. Cl. .................. 219/137.61; 219/136
[58] Field of Search .................. 219/137.61, 136

[56] References Cited

FOREIGN PATENT DOCUMENTS

| | | |
|---|---|---|
| 51-21081 | 6/1976 | Japan . |
| 61-143770 | 9/1986 | Japan . |
| 61-1433771 | 9/1986 | Japan . |
| 62-77671 | 5/1987 | Japan . |
| 872099 | 10/1981 | U.S.S.R. .................. 219/137.61 |

OTHER PUBLICATIONS

Thorne, J. Paul, "Aircraft and Commerical Applications of Direct Current Resistance Welding Using Silicon Diodes," Welding Research Suppl., Welding J. 9:282–288, Jun. 1965.

Balder, T. C., "Influence of the Peltier Effect in Resistance Welding," Philips Technical Review, vol. 20:188–192, 1958/59.

Primary Examiner—Clifford C. Shaw
Attorney, Agent, or Firm—Finnegan, Henderson, Farabow, Garrett & Dunner

[57] ABSTRACT

A contact tip for arc welding includes a feed surface constructed of conductive material which has a negative thermoelectromotive force with respect to pure platinum at temperatures above 0° C. When welding current flows from the contact tip to a welding wire, an endothermic reaction occurs at the feed surface to lower the temperature of the feed surface and to improve the thermal durability of the contact tip.

6 Claims, 3 Drawing Sheets

CONTACT TIP FOR ARC WELDING

BACKGROUND OF THE INVENTION

1. Field of the Invention

The present invention relates to a contact tip for arc welding.

2. Description of the Prior Art

Copper is usually used as the material for contact tips for arc welding, because copper is relatively cheap and easy to machine. However, a contact tip constructed of copper has insufficient durability because it can be seriously abraded and sometimes becomes fused to a welding wire when it is excessively heated by a large amount of resistance heat due to a large welding current acting on a small contact area.

To improve thermal durability of the contact tip, Japanese Utility Model Publication SHO 62-77671 proposes to construct the contact tip from hard conductive ceramics, and Japanese Utility Model Publication SHO 51-21081 also proposes to form an anti-oxidation alloy layer through diffusion at the feed surface where the welding wire slidingly contacts the tip.

However, in the case of a conductive ceramics material, there is a problem that cracks tend to initiate at high temperatures because ceramics are brittle. Also, in the case of an alloy layer, there is a problem that the alloy layer tends to flake from the base metal due to a difference in thermal expansion coefficients. As a result, no great improvement in durability can be obtained in the prior art countermeasures.

SUMMARY OF THE INVENTION

An object of the invention is to provide a measure to improve thermal durability of a contact tip wherein the prior art approach of constructing the feed surface defining portion of the tip from a heat-proof material is replaced by a different approach of lowering the temperature of the feed surface of the contact tip during welding.

The above-described object can be achieved by a contact tip for arc welding in accordance with the present invention wherein at least one portion of the contact tip defining at least one portion of a feed surface of the contact tip is constructed of such a conductive material that generates a negative thermoelectromotive force with respect to pure platinum at temperatures above 0° C. when electric current flows through the feed surface.

In the above-described contact tip, when welding current flows from the contact tip to the welding wire, an endothermic reaction due to Peltier effect (the endothermic heat quantity being calculated as the product of the thermoelectromotive force and the electric current) occurs at the feed surface to lower the temperature of the feed surface. As a result, the thermal durability of the contact tip is greatly improved.

BRIEF DESCRIPTION OF THE DRAWINGS

The above and other objects, features and advantages of the present invention will become more apparent and will be more readily appreciated from the following detailed description of the preferred exemplary embodiments of the invention taken in conjunction with the following accompanying drawings, in which.

DETAILED DESCRIPTION OF THE PREFERRED EMBODIMENTS

A contact tip or welding tip for arc welding in one embodiment of the invention will be explained.

Figure 1:
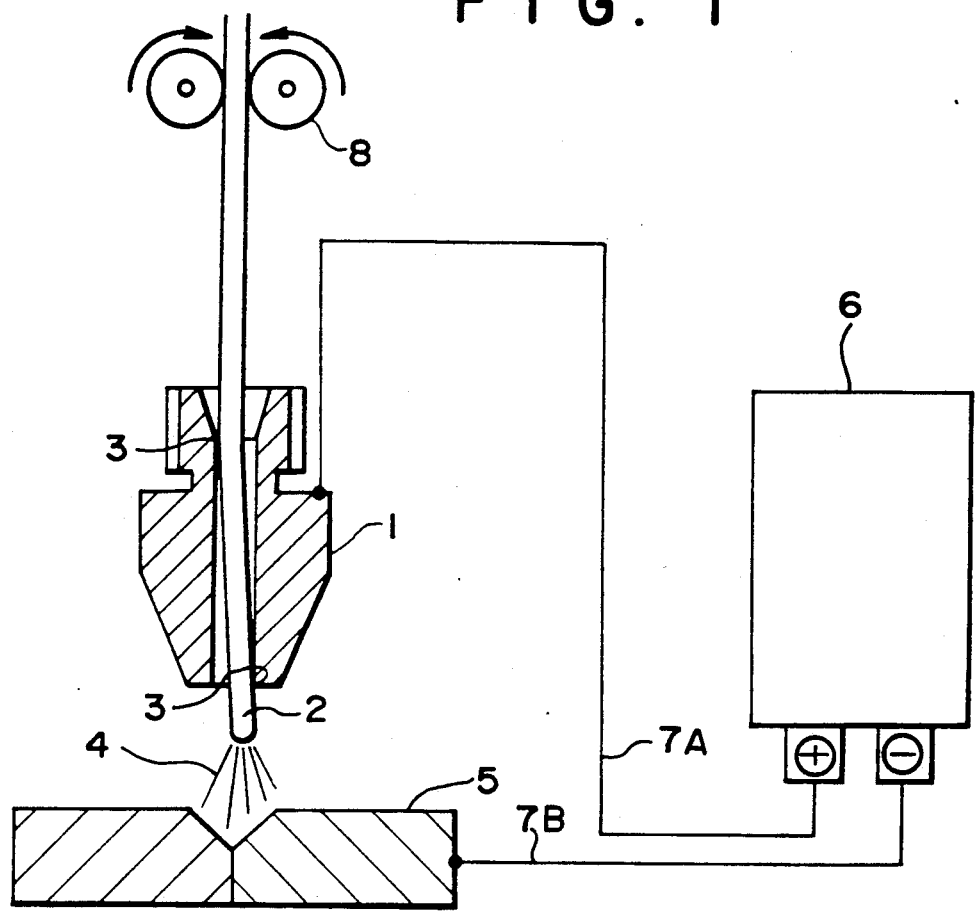
FIG. 1 is a cross-sectional view of a contact tip for arc welding including an electric circuit therefor in accordance with one embodiment of the present invention.

As illustrated in FIG. 1, a contact tip 1 includes an axially penetrating hole through which a welding wire 2 passes. The welding wire 2 is driven by rollers 8 and is continuously supplied to the base material members 5 to be welded. The contact tip 1 is connected via an electric cable 7A to a welding power source 6, and the base material member 5 is connected via an electric cable 7B to the welding source 6. Electric current flows from the welding source 6 through the electric cable 7A to the contact tip 1, then from a feed surface of the tip 1 (a surface of the tip 1 defining the hole) to the welding wire 2, and then from the welding wire 2 via an arc to the base material member 5, and returns from the base material member 5 to the welding source 6. The welding wire 2 is melted by the heat generated at the arc so that welding is executed.

The material of the welding wire 2 is selected according to the material of the base material member 5, for example, iron, copper, and aluminum. For the material of the contact tip 1, a conductive material is selected whose thermoelectromotive force with respect to pure platinum is negative at temperatures above 0° C. Such conductive material includes, for example, constantan (60% Cu+40% Ni), Nickel, and alumel (94% Ni+2% Al+1% Si+0.5% Fe+2.5% Mn). In the case where any one of these conductive materials is used for the material of the contact tip 1, an endothermic reaction due to Peltier effect occurs at the feed surface of the contact tip 1 when the electric current flows from the contact tip 1 to the welding wire 2. More particularly, the endothermic heat quantity obtained as the product of the thermoelectromotive force and the welding current, occurs at the feed surface 3 of the contact tip 1 to lower the temperature of the feed surface 3. As a result, the temperature of the feed surface 3 is lowered and abrasion of the contact tip 1 is suppressed.

Figure 4:
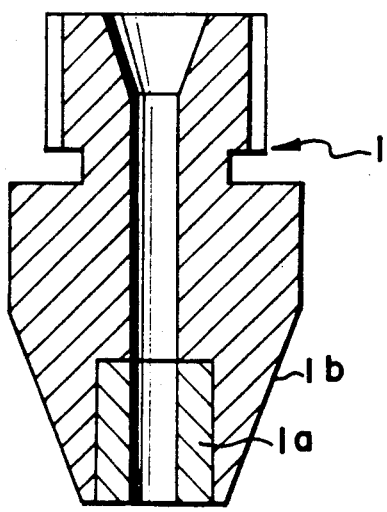
FIG. 4 is a cross-sectional view of a contact tip in accordance with another embodiment of the present invention.

In the embodiment of FIG. 1, the entire portion of of the contact tip 1 is constructed of the conductive material selected from constantan, nickel and alumel. Alternatively, as illustrated in FIG. 4, only one portion of the contact tip 1 may be constructed of the conductive material selected from constantan, nickel and alumel. More particularly, a ring 1a constructed of the conductive material selected from constantan, nickel and alumel is embedded in at least one axial end portion of the contact tip main body 1b so that a portion of the tip defining at least one end portion of the hole therein (that is, at least one portion of the feed surface 3) is constructed of the material having a negative thermoelectromotive force with respect to pure platinum at temperatures above 0° C.

Figure 2:
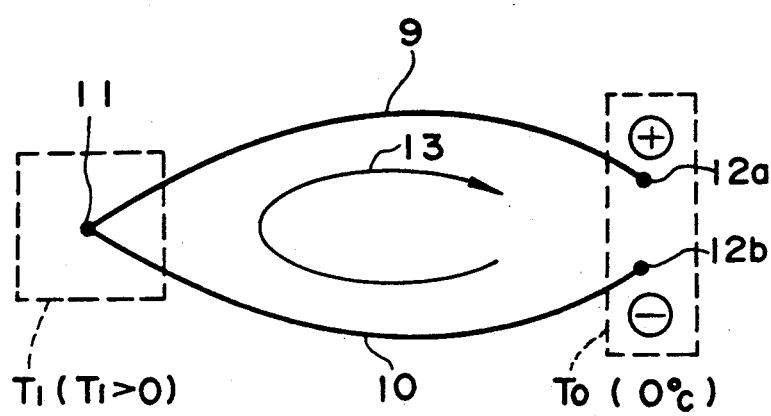
FIG. 2 is a diagram of a thermo-electric circuit of a device used when selecting material for the contact tip.

FIG. 2 illustrates a basis for selecting the aforementioned conductive material. The thermo-electric circuit of FIG. 2 includes a pure platinum lead 9, a lead 10 constructed of contact tip material, a high temperature contact 11, and base contacts 12a and 12b. Arrow 13 illustrates the direction of electric current.

In FIG. 2, when the temperature T1 of the high temperature contact 11 is equal to the temperature T0 (0° C.) of the base contacts, the potential difference between the base contacts 12a and 12b is zero. When the temperature T1 rises, a potential difference is generated between the platinum side of the contact 11 and the contact tip material side of the contact 11, so that one base contact 12a is positive and another base contact 12b is negative in potential. Under this condition, when the base contact 12a and the base contact 12b are contacted with each other, an electric current will be generated in the direction of arrow 13. This means that the thermal energy of the high temperature contact 11 is changed into the electric energy of the electric current 13 and that the endothermic reaction occurs at the high temperature contact 11. This endothermic phenomenon is called the Peltier effect.

In the present invention, this type of endothermic phenomenon is applied to a contact tip for arc welding. More particularly, when an electric current having a flow direction of arrow 13 is forcibly generated by an outside source, the high temperature contact 11 can be positively cooled. In this instance, when replacing the flow direction shown by arrow 13, the contact tip material 10, and pure platinum 9 of the basic circuit of FIG. 2 by the arc current direction (defined by positive and negative terminals of the welding source 6), the contact tip 1, and the welding wire 2, respectively, of FIG. 1, it will be easily understood that the feed surface 3 corresponding to the high temperature contact 11 is cooled. This is the reason why a conductive material having a negative thermoelectromotive force with respect to pure platinum at temperatures above 0° C. is used for the material of the portion of the contact tip 1 defining the feed surface 3.

Figure 3:
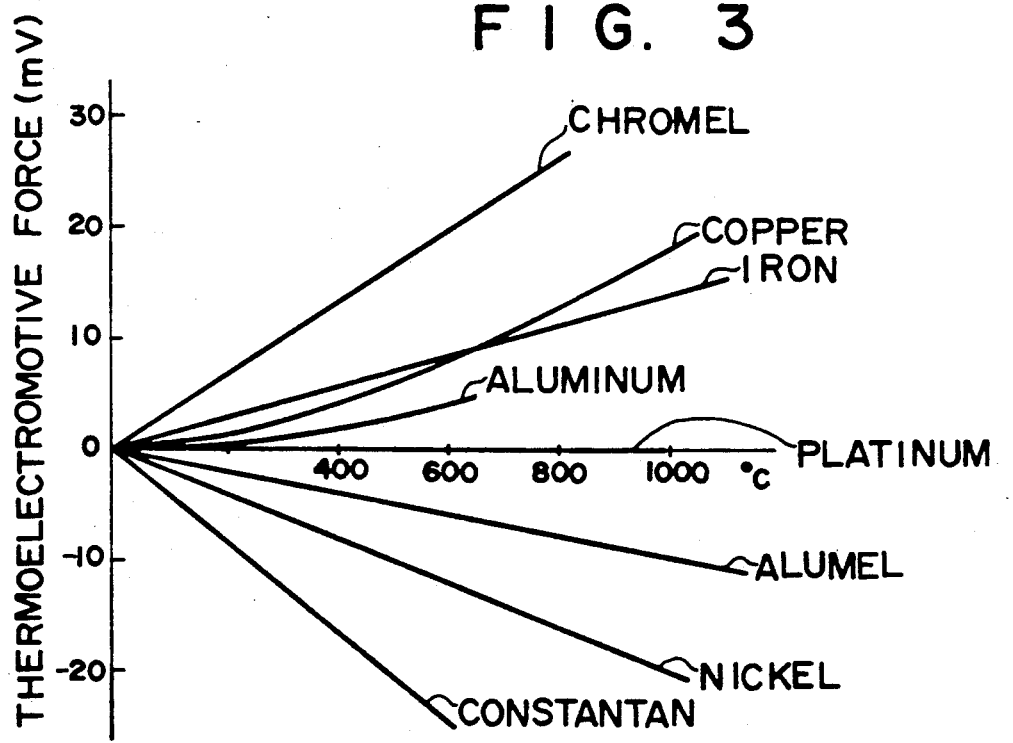
FIG. 3 is a graph illustrating thermoelectromotive forces with respect to pure platinum, of various materials.

FIG. 3 illustrates the thermoelectromotive forces of various materials with respect to pure platinum. The axis of the abscissas corresponds to the thermoelectromotive force of pure platinum itself. As will be easily understood from the foregoing explanation with reference to FIG. 2, it is preferable to select a material for the welding wire 2 from any one of the materials having a characteristic extending above the axis of the abscissas of FIG. 3, to select a material for the contact tip 1 from any one of the materials having a characteristic extending below the axis of the abscissas of FIG. 3, and to use the selected materials in combination. Since the materials usually employed for the welding wire 2 include iron, copper, and aluminum, a material selected from alumel, nickel, and constantan is preferably used for the contact tip 1.

As discussed above, copper is used as the material for conventional contact tips, so that an endothermic reaction due to the Peltier effect cannot be obtained in a conventional contact tip, and in the case of aluminum wire, the copper contact tip causes an exothermic reaction. Such a material with a higher positive thermoelectromotive force characteristic than copper, for example chromel, is inappropriate for the material for a contact tip, because the exothermic reaction at the feed surface is increased further.

Tests were executed to compare the durability characteristics of contact tips 1 in accordance with the invention with those of conventional contact tips constructed of copper.

Figure 5:
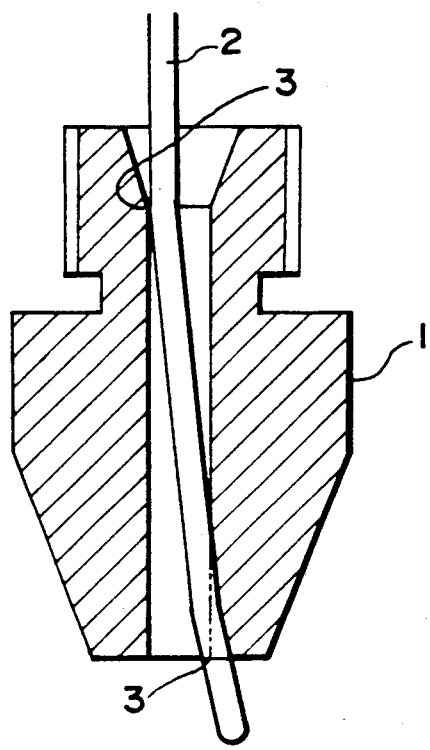
FIG. 5 is a cross-sectional view of a contact tip test piece used for a durability test.
Figure 6:
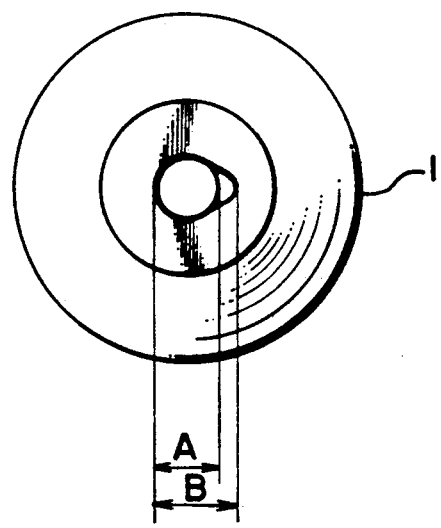
FIG. 6 is a bottom view of the test piece of FIG. 5.

(a) Test conditions were as follows:
Material of the base member: JIS SPH plate thickness: 3.2 mm
Welding electric current: 250 A
Welding electric voltage: 25 V
Inert gas: Mixed gas of 80% argon gas and 20% $CO_2$
Welding speed: 1 m/min
Welding period of time: four hours (b) Abrasion measuring method
As illustrated in FIGS. 5 and 6, when the feed surface 3 is abraded, the hole is enlarged in one direction at the lowermost portion of the contact tip. The differential between the enlarged diameter B and the original diameter A is used as the abrasion quantity. Measurement is executed using a microscope.

The test results are shown in TABLE - 1.

TABLE 1

| WELDING WIRE | CONTACT TIP | ABRASION QUANTITY | ABRASION RATE TO COPPER TIP |
|---|---|---|---|
| iron | copper | 0.40 (mm) | — |
| | constantan | 0.09 | 0.23 |
| | alumel | 0.15 | 0.38 |
| | nickel | 0.11 | 0.28 |
| copper | copper | 0.22 | — |
| | constantan | 0.05 | 0.23 |
| | alumel | 0.09 | 0.41 |
| | nickel | 0.10 | 0.45 |
| aluminum | copper | 0.18 | — |
| | constantan | 0.05 | 0.28 |
| | alumel | 0.07 | 0.39 |
| | nickel | 0.06 | 0.33 |

From TABLE-1, it can be seen that the abrasion of the contact tip can be suppressed to less than 45% of the abrasion of the conventional tip by selecting for the material of the contact tip a conductive material selected from constantan, alumel, and nickel.

In accordance with the present invention, the following advantages are obtained:

First, since at least one portion of the feed surface 3 of the contact tip 1 is constructed of conductive material whose thermoelectromotive force with respect to pure platinum is negative at temperatures above 0° C., the thermal energy generated at the feed surface due to electric resistance is absorbed thereby to promote cooling of the feed surface. As a result, thermal durability of the contact tip 1 is greatly improved.

Secondly, since abrasion of the contact tip 1 is suppressed, the arc is stable for a relatively long time of period. Therefore, welding quality is improved.

Thirdly, since abrasion of the contact tip 1 is suppressed, the number of times the contact tip needs to be replaced by a new one is decreased. Therefore, the working efficiency of the welding apparatus including the welding tip is increased.

Finally, since the feed surface of the contact tip is formed by the conductive material, the manufacturing step is decreased as compared with the conventional tip with an alloy layer formed through diffusion.

Although only a few embodiments of the invention have been described in detail above, it will be appreicated by those skilled in the art that various modifications and alterations can be made to the particular embodiments shown without materially departing from the novel teachings and advantages of the invention. Accordingly, it is to be understood that all such modifications and alterations are included within the spirit and scope of the invention as defined by the following claims.

What is claimed is:

1. A contact tip for arc welding which comprises a contact tip having at least one portion of the contact tip which defines a feed surface and is constructed of a conductive material that generates a negative thermoelectromotive force with respect to pure platinum at temperatures above 0° C. when electric current flows through the feed surface so that when an electric current flows from the contact tip to a welding wire being passed through the contact tip an endothermic reaction occurs at the feed surface to lower the temperature thereof.

2. A contact tip for arc welding according to claim 1, wherein the conductive material is constantan.

3. A contact tip for arc welding according to claim 1, wherein the conductive material is alumel.

4. A contact tip for arc welding according to claim 1, wherein the conductive material is nickel.

5. A contact tip for arc welding according to claim 1, wherein the entire contact tip is constructed of the conductive material having a negative thermoelectromotive force with respect to pure platinum at temperatures above 0° C.

6. A contact tip for arc welding according to claim 1, wherein the contact tip has an axially extending hole to receive a welding wire and a portion of the tip defining at least one end portion of the hole therein is constructed of the material having a negative thermoelectromotive force with respect to pure platinum at temperatures above 0° C.

* * * * *